United States Patent
Lu

(10) Patent No.: US 9,948,117 B2
(45) Date of Patent: Apr. 17, 2018

(54) BATTERY BALANCING APPARATUS AND BATTERY BALANCING METHOD THEREOF

(71) Applicant: Acer Incorporated, New Taipei (TW)

(72) Inventor: Chi-Nan Lu, New Taipei (TW)

(73) Assignee: Acer Incorporated, New Taipei (TW)

(*) Notice: Subject to any disclaimer, the term of this patent is extended or adjusted under 35 U.S.C. 154(b) by 101 days.

(21) Appl. No.: 15/220,271

(22) Filed: Jul. 26, 2016

(65) Prior Publication Data
US 2017/0033571 A1  Feb. 2, 2017

(30) Foreign Application Priority Data
Jul. 31, 2015 (TW) .............................. 104125034 A

(51) Int. Cl.
*H02J 7/00* (2006.01)
*H02J 1/00* (2006.01)

(52) U.S. Cl.
CPC .......... *H02J 7/0016* (2013.01); *H02J 7/0014* (2013.01)

(58) Field of Classification Search
CPC .............................. H02J 7/0014; H02J 7/0016
USPC .................................. 320/166, 116, 118, 120
See application file for complete search history.

(56) References Cited

U.S. PATENT DOCUMENTS

| | | | | |
|---|---|---|---|---|
| 5,952,815 A | * | 9/1999 | Rouillard | H02J 7/0021 320/116 |
| 7,414,334 B2 | * | 8/2008 | Grundmann | H02J 7/345 307/110 |
| 7,592,773 B2 | * | 9/2009 | Pellenc | H02J 7/0013 320/112 |
| 7,615,966 B2 | * | 11/2009 | Houldsworth | H02J 7/0016 320/118 |

(Continued)

FOREIGN PATENT DOCUMENTS

| | | |
|---|---|---|
| CN | 104471417 | 3/2015 |
| TW | 201307875 | 2/2013 |
| TW | 201400838 | 1/2014 |

OTHER PUBLICATIONS

Stephen W. Moore, et al., "A Review of Cell Equalization Methods for Lithium Ion and Lithium Polymer Battery ystems," SAE Technical Paper 2001-01-0959, Mar. 2001, pp. 1-5.

*Primary Examiner* — M'Baye Diao
(74) *Attorney, Agent, or Firm* — J.C. PATENTS

(57) ABSTRACT

A battery balancing apparatus configured to perform a battery balancing for a battery pack is provided. The battery balancing apparatus includes n energy storage elements connected in series, n resistors connected in series and a switch unit. First and second terminals of an $i^{th}$ resistor among the n resistors are connected to first and second terminals of an $i^{th}$ energy storage element respectively, where n and i are positive integers and $1 \leq i \leq n$. In a first period, the switch unit selects at least one $i^{th}$ battery unit from among the battery units, and connects positive and (Continued)

negative electrode terminals of the $i^{th}$ battery unit to the first and second terminals of the $i^{th}$ energy storage element respectively, so as to perform the battery balancing. A battery balancing method is also provided.

15 Claims, 13 Drawing Sheets

(56) References Cited

U.S. PATENT DOCUMENTS

| | | | |
|---|---|---|---|
| 7,750,607 B2 | 7/2010 | Nakajima et al. | |
| 8,384,245 B2 * | 2/2013 | Stauth | H01L 31/02021 307/77 |
| 8,405,352 B2 * | 3/2013 | Lim | H02J 7/0016 320/116 |
| 8,497,661 B2 * | 7/2013 | Murao | H02J 7/0016 320/118 |
| 8,518,570 B2 * | 8/2013 | Kudo | H01M 10/425 320/116 |
| 8,947,048 B2 * | 2/2015 | Roessler | H02J 7/0016 320/103 |
| 9,257,860 B2 * | 2/2016 | Kim | H02J 7/0016 |
| 9,337,670 B2 * | 5/2016 | Drobnik | H02J 7/0018 |
| 9,568,555 B2 * | 2/2017 | Nortman | H02J 7/0016 |
| 9,647,467 B2 * | 5/2017 | Verhaeven | H02J 7/0016 |
| 2006/0119319 A1 * | 6/2006 | Sakurai | H02J 7/0016 320/116 |
| 2011/0140662 A1 * | 6/2011 | Li | H02J 7/0016 320/116 |
| 2013/0093248 A1 * | 4/2013 | Liu | H02J 7/0016 307/77 |
| 2014/0266003 A1 * | 9/2014 | Biskup | H02J 7/0016 320/103 |
| 2014/0349146 A1 | 11/2014 | Dittmann | |
| 2016/0126737 A1 * | 5/2016 | Dijkhuizen | H02J 3/1857 307/46 |

* cited by examiner

BATTERY BALANCING APPARATUS AND BATTERY BALANCING METHOD THEREOF

CROSS-REFERENCE TO RELATED APPLICATION

This application claims the priority benefit of Taiwan application serial no. 104125034, filed on Jul. 31, 2015. The entirety of the above-mentioned patent application is hereby incorporated by reference herein and made a part of this specification.

BACKGROUND OF THE INVENTION

Field of the Invention

The invention relates to an electronic apparatus, and more particularly, to a battery balancing apparatus and a battery balancing method.

Description of Related Art

With advancements in technologies, battery packs have been widely applied in various electronic apparatuses. However, because of repeatedly charging/discharging of the battery pack, manufacturing variations in each battery cell or even artificial improper operations, a battery capacity imbalance may occur on the battery pack in the electronic apparatus. The battery capacity imbalance can affect the performance and lifetime of the battery pack. For instance, during discharging of the battery pack, because a battery cell with low capacity can quickly be discharged while a battery cell with high capacity is still discharging, the battery cell with low capacity is forced to discharge continuously and result in damages on the battery cell with low capacity due to the over discharge. During charging of the battery pack, because the battery cell with high capacity can be quickly charged while the battery cell with low capacity is still charging, the battery cell with high capacity is forced to charge continuously and result in damages on the battery cell with high capacity due to the over charge.

For the defects as mentioned above, it has become a very important issue to be solved as how to design a battery balancing apparatus for maintaining both performance and lifetime for the battery in the electronic apparatus.

SUMMARY OF THE INVENTION

The invention is directed to a battery balancing apparatus and a battery balancing method, which are configured to perform a battery balancing for a battery pack.

A battery balancing apparatus configured to perform a battery balancing for a battery pack is provided according to the embodiments of the invention. The battery balancing apparatus includes n energy storage elements, n resistors and a switch unit. The n energy storage elements are connected to each other in series. The n resistors are connected to each other in series. First and second terminals of an $i^{th}$ resistor among the n resistors are connected to first and second terminals of an $i^{th}$ energy storage element respectively, where n and i are positive integers, n is greater than 1 and $1 \le i \le n$. The switch unit is configured to connect the n energy storage elements with n battery units connected to each other in series in the battery pack. In a first period, the switch unit selects an $i^{th}$ battery unit from among the battery units, and connects positive and negative electrode terminals of the $i^{th}$ battery unit to the first and second terminals of the $i^{th}$ energy storage element respectively, so as to perform the battery balancing.

A battery balancing method configured to perform a battery balancing for a battery pack is provided according to the embodiments of the invention. The battery balancing method includes: providing n resistors connected to each other in series and providing n energy storage elements connected to each other in series. First and second terminals of an $i^{th}$ resistor among the resistors are connected to first and second terminals of an $i^{th}$ energy storage element respectively, where n and i are positive integers, n is greater than 1 and $1 \le i \le n$. In a first period, at least one $i^{th}$ battery unit is selected from among the battery units, and a positive electrode terminal and a negative electrode terminal of the $i^{th}$ battery unit are connected to the first terminal and the second terminal of the $i^{th}$ energy storage element respectively.

Based on the above, in the battery balancing apparatus and a balancing method thereof according to the embodiments of the invention, the n energy storage elements, the n resistors and the switch unit are used together with different settings of the battery balancing period to perform the battery balancing for the n battery units.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
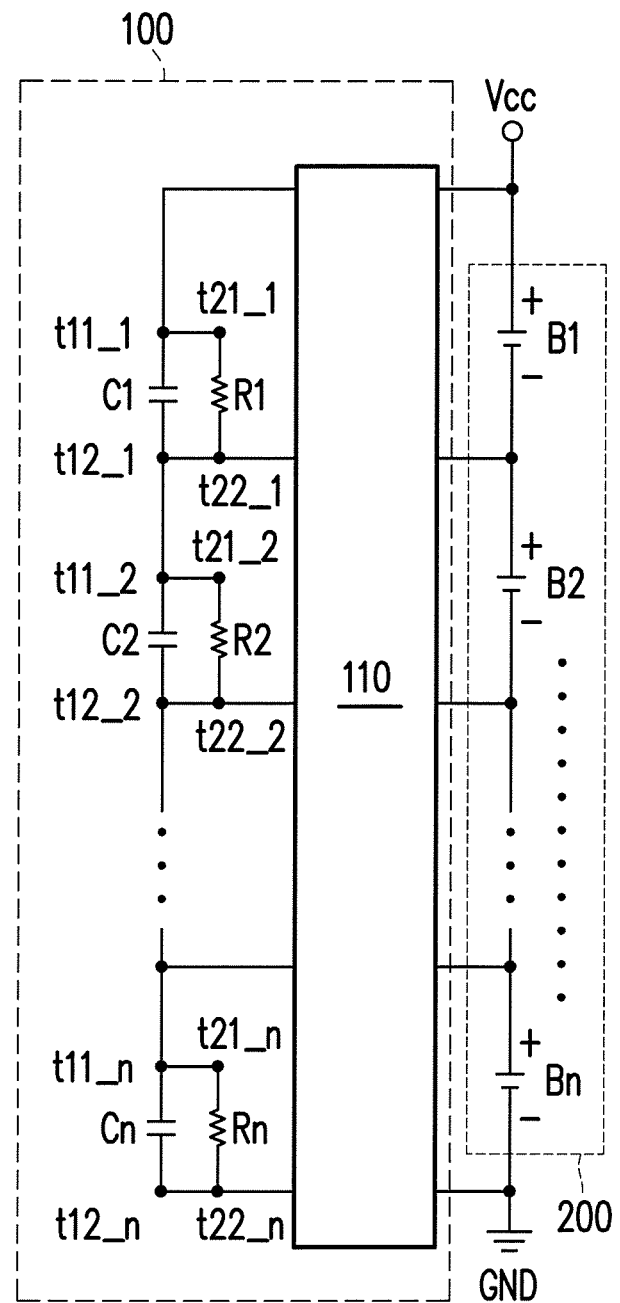
FIG. 1 is a schematic diagram illustrating circuitry of a battery balancing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic diagram illustrating circuitry of a battery balancing apparatus according to an embodiment of the invention. Herein, a battery balancing apparatus 100 is configured to perform a battery balancing for a battery pack 200. The battery pack 200 has n battery units B1 to Bn, and the battery units B1 to Bn are connected to each other in series between a system voltage Vcc and a ground voltage GND, as shown in FIG. 1. The system voltage Vcc and the ground voltage GND are capable of charging the battery pack 200.

The battery balancing apparatus 100 includes n energy storage elements C1 to Cn, n resistors R1 to Rn and a switch unit 110. In the embodiment depicted in FIG. 1, the energy storage elements C1 to Cn may be capacitors. In other embodiments, the energy storage elements C1 to Cn may be other type of electrical energy storage elements, such as batteries. The energy storage elements C1 to Cn are connected to each other in series. The resistors R1 to Rn are connected to each other in series. A first terminal $t21\_i$ and a second terminal $t22\_i$ of an $i^{th}$ resistor Ri among the resistors R1 to Rn are connected to a first terminal $t11\_i$ and a second terminal $t12\_i$ of an $i^{th}$ energy storage element Ci among the energy storage elements C1 to Cn respectively, where n and i are positive integers, n is greater than 1 and $1 \le i \le n$. For instance, a first terminal $t21\_1$ and a second terminal $t22\_1$ of the first resistor R1 are connected to a first terminal $t11\_1$ and a second terminal $t12\_1$ of the first energy storage element C1 respectively, and a first terminal $t21\_2$ and a second terminal $t22\_2$ of the second resistor R2 are connected to a first terminal $t11\_2$ and a second terminal $t12\_2$ of the second energy storage element C2 respectively, as shown in FIG. 1. By analogy, a first terminal $t21\_n$ and a second terminal $t22\_n$ of an $n^{th}$ resistor Rn are connected to a first terminal $t11\_n$ and a second terminal $t12\_n$ of an $n^{th}$ energy storage element Cn respectively. In the present embodiment, the switch unit 110 can connect the energy storage elements C1 to Cn with the battery units B1 to Bn.

It should be noted that, before the battery balancing apparatus 100 performs the battery balancing for the batter pack 200, the battery balancing apparatus 100 performs an initialization on the energy storage elements C1 to Cn in an initializing period. In the initializing period, the switch unit 110 can connect the system voltage Vcc to the first terminal $t11\_1$ of the first energy storage element C1 among the energy storage elements C1 to Cn, and connect the ground voltage GND to the second terminal $t12\_n$ of the $n^{th}$ energy storage element Cn among the energy storage elements C1 to Cn. The resistors R1 to Rn connected to each other in series can divide the system voltage Vcc according to a resistance ratio, so as to determine/provide a plurality of voltage-divided voltages. Because the resistors R1 to Rn are in parallel with the corresponding energy storage elements C1 to Cn respectively, each of the voltage-divided voltages can charge respective one of the energy storage elements C1 to Cn, so as to determine a voltage of each of the energy storage elements C1 to Cn. By setting the resistance ratio of the resistors R1 to Rn, a cross voltage of each energy storage element can be set as a rated fully-charged voltage of the corresponding battery unit. For example, the cross voltage of the $i^{th}$ energy storage element Ci may be set as the rated fully-charged voltage of the corresponding battery unit Bi. In other words, the resistance ratio of the resistors R1 to Rn may be determined in response to specifications (e.g., rated voltages) of the battery units B1 to Bn. In some application examples, the battery units B1 to Bn may include the same rated fully-charged voltage, such that the resistors R1 to Rn can include the same resistance (i.e., the resistance ratio of any two resistors among the resistors R1 to Rn is 1:1).

After the initializing period ends, the battery balancing apparatus 100 can perform the battery balancing for the battery pack 200. The switch unit 110 can select one or more battery units from among the battery units B1 to Bn in a first period of a battery balancing period. For instance (but not limited thereto), the switch unit 110 can select an $i^{th}$ battery unit Bi from among the battery units B1 to Bn in the first period. After the $i^{th}$ battery unit Bi is selected, in the first period, the switch unit 110 can connect a positive electrode terminal and a negative electrode terminal of the battery unit Bi to a first terminal and a second terminal of the corresponding energy storage element (e.g., the first terminal $t11\_i$ and the second terminal $t12\_i$ of the $i^{th}$ energy storage element Ci) respectively, so as to perform the battery balancing. The switch unit 110 can select one or more battery units from among the battery units B1 to Bn in a second period of the battery balancing period. For instance (but not limited thereto), the switch unit 110 can select a $j^{th}$ battery unit Bj from among the battery units B1 to Bn in the second period, wherein j is a positive integer, $1 \le j \le n$ and j is not equal to i. After the $j^{th}$ battery unit Bj is selected, the switch unit 110 can connect a positive electrode terminal and a negative electrode terminal of the $j^{th}$ battery unit Bj to a first terminal $t11\_j$ and a second terminal $t12\_j$ of a $j^{th}$ energy storage element Cj respectively, and disconnects at least one of the positive electrode terminal and the negative electrode terminal of the battery unit Bi from the first terminal $t11\_j$ and the second terminal $t12\_i$ of the $i^{th}$ energy storage element. Operations regarding the rest of the battery units may be deduced by analogy from the above.

Accordingly, in the battery balancing period, the switch unit 110 can electrically connect different battery units to the corresponding energy storage elements in different time periods. For instance, in the first period of the battery balancing period, the switch unit 110 can select to electrically connect the positive electrode terminal and the negative electrode terminal of the first battery unit B1 to the first terminal t11_i and the second terminal t12_1 of the first energy storage element C1 respectively, disconnect the negative electrode terminal of the second battery unit B2 from the second terminal t12_2 of the second energy storage element C2, and disconnect the positive electrode terminals and the negative electrode terminals of the other battery units B3 to Bn from the first terminals and the second terminals of the corresponding energy storage elements C3 to Cn. In the second period of the battery balancing period, the switch unit 110 can select to electrically connect the positive electrode terminal and the negative electrode terminal of the second battery B2 to the first terminal t11_2 and the second terminal t12_2 of the second energy storage element C2 respectively, disconnect the positive electrode terminal of the first battery unit B1 from the first terminal t11_1 of the first energy storage element C1, disconnect the negative electrode terminal of the third battery unit B3 from the second terminal of the third energy storage element C3, and disconnect the positive electrode terminals and the negative electrode terminals of the other battery units B4 to Bn from the first terminals and the second terminals of the corresponding energy storage elements C4 to Cn. By analogy, in an $n^{th}$ period of the battery balancing period, the switch unit 110 can select to electrically connect the positive electrode terminal and the negative electrode terminal of the $n^{th}$ battery unit Bn to the first terminal t11_n and the second terminal t12_n of the $n^{th}$ energy storage element Cn respectively, disconnect the positive electrode terminal of an $(n-1)^{th}$ battery unit Bn-1 from the first terminal of an $(n-1)^{th}$ energy storage element Cn-1, and disconnect the positive electrode terminals and the negative electrode terminals of the other battery units B1 to Bn-2 from the first terminals and the second terminals of the corresponding energy storage elements C1 to Cn-2.

In some other embodiments, in the first period, the switch unit 110 can select a plurality of first battery units including the $i^{th}$ battery unit Bi from among the battery unit B1 to Bn, and connect the positive electrode terminals and the negative electrode terminals of the selected first battery units to the first terminals and the second terminals of a plurality of first corresponding energy storage elements including the $i^{th}$ energy storage element Ci among the energy storage elements C1 to Cn respectively; and in the second period, the switch unit 110 can select a plurality of second battery units from among the battery units B1 to Bn, and connect positive electrode terminals and negative electrode terminals of the second battery units to first terminals and second terminals of a plurality of second corresponding energy storage elements among the energy storage elements C1 to Cn respectively. For instance (but not limited thereto), in the first period of the battery balancing period, the switch unit 110 can select to electrically connect the positive electrode terminal and the negative electrode terminal of the first battery unit B1 to the first terminal t11_1 and the second terminal t12_1 of the first energy storage element C1 respectively, electrically connect the positive electrode terminal and the negative electrode terminal of the second battery unit B2 to the first terminal t11_2 and the second terminal t12_2 of the second energy storage element C2, disconnect the negative electrode terminal of the third battery unit B3 from the second terminal of the third energy storage element C3, and disconnect the positive electrode terminals and the negative electrode terminals of the other battery units B4 to Bn from the first terminals and the second terminals of the corresponding energy storage elements C4 to Cn. In the second period of the battery balancing period, the switch unit 110 can select to electrically connect the positive electrode terminal and the negative electrode terminal of the second battery B2 to the first terminal t11_2 and the second terminal t12_2 of the second energy storage element C2 respectively, electrically connect the positive electrode terminal and the negative electrode terminal of the third battery unit B3 to the first terminal and the second terminal of the third energy storage element C3, disconnect the positive electrode terminal of the first battery unit B1 from the first terminal t11_1 of the first energy storage element C1, disconnect the negative electrode terminal of the fourth battery unit B4 from the second terminal of the fourth energy storage element C4, and disconnect the positive electrode terminals and the negative electrode terminals of the other battery units B5 to Bn from the first terminals and the second terminals of the corresponding energy storage elements C5 to Cn. By analogy, in an $(n-1)^{th}$ period of the battery balancing period, the switch unit 110 can select to electrically connect the positive electrode terminal and the negative electrode terminal of the $(n-1)^{th}$ battery unit Bn-1 to the first terminal and the second terminal of the $(n-1)^{th}$ energy storage element Cn-1 respectively, electrically connect the positive electrode terminal and the negative electrode terminal of the $n^{th}$ battery unit Bn to the first terminal t11_n and the second terminal t12_n of the $n^{th}$ energy storage element Cn, disconnect the positive electrode terminal of the $(n-2)^{th}$ battery unit Bn-2 from the first terminal of the $(n-2)^{th}$ energy storage element Cn-2, and disconnect the positive electrode terminals and the negative electrode terminals of the other battery units B1 to Bn-3 from the first terminals and the second terminals of the corresponding energy storage elements C1 to Cn-3.

In some other embodiments, the switch unit 110 can electrically connect each of the battery units B1 to Bn to the corresponding one of the energy storage elements C1 to Cn respectively during the battery balancing.

In yet another embodiment, the battery balancing apparatus 100 can perform the battery balancing for the battery pack 200 during a non-charing period. In said non-charging period, the system voltage Vcc may be removed, or the system voltage Vcc is not used to charge the battery pack 200. In the case where the system voltage Vcc is not used to charge the battery pack 200, the batter pack 200 can provide a voltage to the energy storage elements C1 to Cn and the resistors R1 to Rn through the switch unit 100, so that the initialization may be performed on the energy storage elements C1 to Cn in the initializing period. In the initializing period, the switch unit 110 can connect a positive electrode terminal of the battery pack 200 to the first terminal t11_1 of the first energy storage element C1 among the energy storage elements C1 to Cn, and connect a negative electrode terminal of the battery pack 200 to the second terminal t12_n of the $n^{th}$ energy storage element Cn among the energy storage elements C1 to Cn. The resistors R1 to Rn can divide the voltage of the battery pack 200 according to the resistance ratio, so as to charge the energy storage elements C1 to Cn. After the initializing period ends, the battery balancing apparatus 100 can perform the battery balancing for the battery pack 200. Details regarding the battery balancing operation performed by the switch unit 110 in the battery balancing period may refer to related descriptions in the foregoing embodiments, which are not repeated hereinafter.

In summary, each battery unit is assigned with one corresponding energy storage element. In the initializing period, each energy storage element can be charged to reach the rated fully-charged voltage of the corresponding battery unit. After the initializing period ends, the battery balancing apparatus 100 can perform the battery balancing for the battery pack 200. During the battery balancing period, the switch unit 110 can electrically connect different battery units to the corresponding energy storage elements in different time periods. For instance, if the $i^{th}$ battery unit Bi is not fully-charged (the capacity thereof does not reach 100%, that is, the voltage of the battery unit Bi is lower than the rated fully-charged voltage), the corresponding energy storage element Ci can output a charging electrical energy to the battery unit Bi through the switch unit 110. Conversely, if the $i^{th}$ battery unit Bi is over-charged (the capacity thereof exceeds 100%, that is, the voltage of the battery unit Bi is higher than the rated fully-charged voltage), the exceeding electrical energy of the battery unit Bi can be unloaded to the corresponding energy storage element Ci and the corresponding resistor Ri through the switch unit 110. As such, in the present embodiment, the capacity of the battery unit Bi is regulated by executing aforesaid charging/discharging means for the at least one battery unit (e.g. $i^{th}$ battery unit Bi) and the at least one corresponding energy storage element (e.g. $i^{th}$ energy storage element Ci), so that a rated voltage ratio may be achieved for each of the battery units B1 to Bn to thereby complete the battery balancing.

Figure 2:
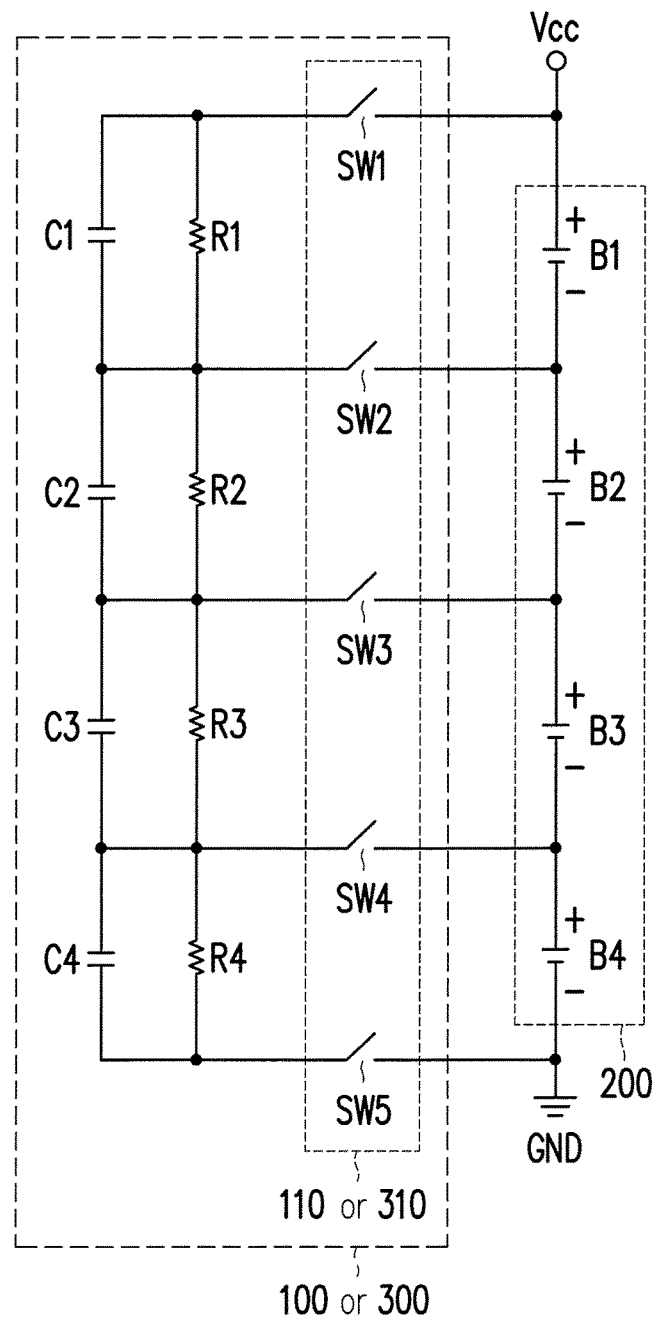
FIG. 2 is a schematic diagram illustrating detailed circuitry of the battery balancing apparatus 100 depicted in FIG. 1 according to an embodiment of the invention.
Figure 3:
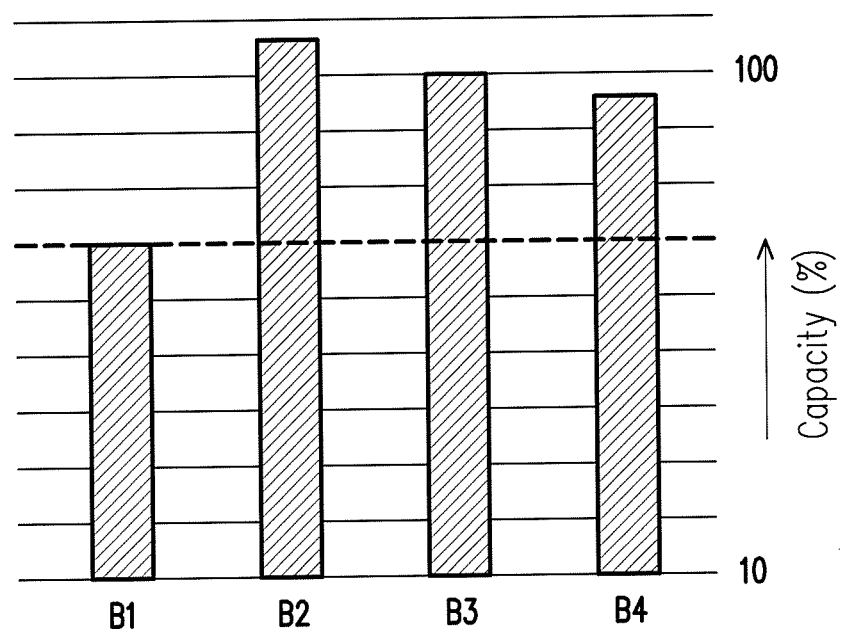
FIG. 3 is a schematic diagram illustrating a battery capacity of the battery pack 200 depicted in FIG. 2 when the battery pack 200 is not connected to the battery balancing apparatus 100 according to an embodiment of the invention.

FIG. 2 to FIG. 5 are exemplary embodiments related to the schematic diagram illustrating the circuitry of the battery balancing apparatus 100 of FIG. 1, but the invention is not limited thereto. For illustrative convenience, it is assumed herein that a number n of the battery units B1 to Bn is 4, and the detailed embodiment of the battery balancing apparatus 100 depicted in FIG. 1 is accordingly illustrated in FIG. 2. In the embodiment shown in FIG. 2, the switch unit 110 includes 5 switches SW1, SW2, SW3, SW4 and SW5. A first terminal and a second terminal of the switch SW1 are connected to the positive electrode terminal of the battery unit B1 and the first terminal of the energy storage element C1 respectively. A first terminal of the switch SW2 is connected to the negative electrode terminal of the battery unit B1 and the positive electrode terminal of the battery unit B2, and a second terminal of the switch SW2 is connected to the second terminal of the energy storage element C1 and the first terminal of the energy storage element C2. A first terminal of the switch SW3 is connected to the negative electrode terminal of the battery unit B2 and the positive electrode terminal of the battery unit B3, and a second terminal of the switch SW3 is connected to the second terminal of the energy storage element C2 and the first terminal of the energy storage element C3. A first terminal of the switch SW4 is connected to the negative electrode terminal of the battery unit B3 and the positive electrode terminal of the battery unit B4, and a second terminal of the switch SW4 is connected to the second terminal of the energy storage element C3 and the first terminal of the energy storage element C4. A first terminal and a second terminal of the switch SW5 are connected to the negative electrode terminal of the battery unit B4 and the second terminal of the energy storage element C4 respectively. FIG. 3 is a schematic diagram illustrating a battery voltage (a battery capacity) of the battery pack 200 depicted in FIG. 2 when the battery pack 200 is not connected to the battery balancing apparatus 100 according to an embodiment of the invention. A vertical axis of FIG. 3 indicates a capacity (in unit of %) of the battery unit. Referring to FIG. 2 and FIG. 3, before the battery balancing apparatus 100 is connected to the battery units B1 to B4, it is possible that a capacity imbalance may occur on the battery units B1 to B4. For example, as shown in FIG. 2, the first and fourth battery units B1 and B4 may not be fully-charged (the capacity thereof does not reach 100%) and the second battery unit B2 may be over-charged (the capacity thereof exceeds 100%). n the scenario shown in FIG. 2, only the third battery unit B3 is fully-charged (the capacity thereof reaches 100%).

Figure 4:
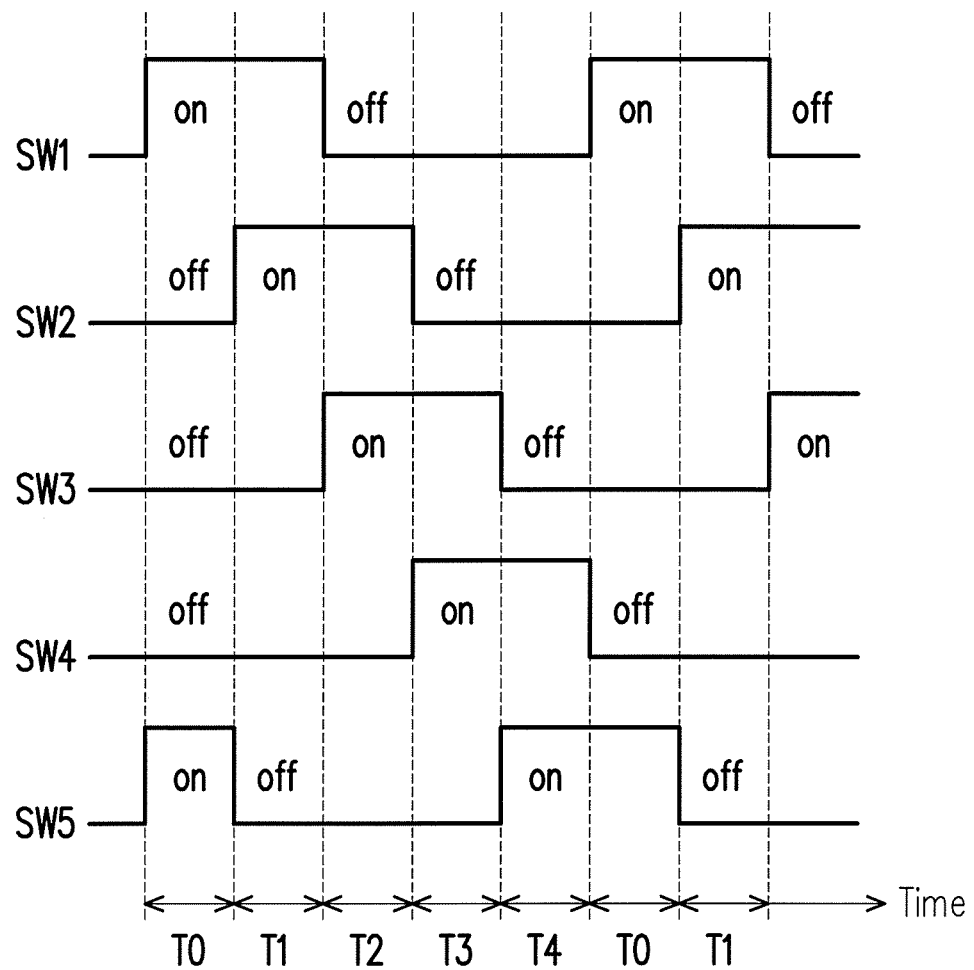
FIG. 4 is a schematic diagram illustrating a switching time sequence when the switch unit 110 depicted in FIG. 2 is performing the battery balancing according to an embodiment of the invention.

FIG. 4 is a schematic diagram illustrating a switching time sequence when the switch unit 110 depicted in FIG. 2 is performing the battery balancing according to an embodiment of the invention. The battery balancing apparatus 100 performs the initialization for the energy storage elements C1 to C4 in an initializing period T0. In the initializing period T0, the switches SW1 and SW5 are turned on and the switches SW2, SW3 and SW4 are turned off. Accordingly, the switch unit 110 can connect the system voltage Vcc to the first terminal of the first energy storage element C1, and connect the ground voltage GND to the second terminal of the fourth energy storage element C4. The resistors R1 to R4 connected to each other in series can divide the system voltage Vcc according to a resistance ratio, so as to determine/provide a plurality of voltage-divided voltages to the energy storage elements C1 to C4. Each of the voltage-divided voltages charges respective one of the energy storage elements C1 to C4, so as to determine an initial voltage of each of the energy storage elements C1 to C4.

By setting the resistance ratio of the resistors R1 to R4, the initial voltage of each energy storage element can be set as a voltage of the corresponding battery unit. For example, in some embodiments where the resistors R1 to R4 include the same resistance, during the charging process for the battery units B1 to B4, the initial voltage of each of the energy storage elements C1 to C4 may be an average value of the voltages (the cross voltage) of the battery units B1 to B4 during the charging. When the battery units B1 to B4 are fully-charged, the initial voltage of the first energy storage element C1 may be set as the rated fully-charged voltage of the corresponding battery unit B1, the initial voltage of the second energy storage element C2 may be set as the rated fully-charged voltage of the corresponding battery unit B2, the initial voltage of the third energy storage element C3 may be set as the rated fully-charged voltage of the corresponding battery unit B3, and the initial voltage of the fourth energy storage element C4 may be set as the rated fully-charged voltage of the corresponding battery unit B4. In other words, the resistance ratio of the resistors R1 to R4 may be determined in response to specifications (e.g., rated voltages) of the battery units B1 to B4. In some application examples, the resistance ratio of the resistors R1 to R4 may be determined in response to a ratio of the rated fully-charged voltages of the battery units B1 to B4. In some other application examples, the battery units B1 to B4 may include the same rated fully-charged voltage, such that the resistors R1 to R4 may include the same resistance (i.e., the resistance ratio of any two resistors among the resistors R1 to R4 is 1:1).

After the initializing period T0 ends, the battery balancing apparatus 100 can perform the battery balancing for the battery pack 200. In a first period T1 of a battery balancing period, the switches SW1 and SW2 are turned on and the switches SW3, SW4 and SW5 are turned off. Accordingly, the switch unit 110 can connect the positive electrode terminal and the negative electrode terminal of the first battery unit B1 to the first terminal and the second terminal of the first energy storage element C1 respectively, so that the first energy storage element C1 can charge the first battery unit B1 which is not fully-charged (the capacity thereof does not reach 100%). In a second period T2 of the battery balancing period, the switches SW2 and SW3 are turned on and the switches SW1, SW4 and SW5 are turned off. Accordingly, the switch unit 110 connects the positive electrode terminal and the negative electrode tell final of the second battery unit B2 to the first terminal and the second terminal of the second energy storage element C2 respectively, so that the second battery unit B2 which is overcharged (the capacity thereof exceeds 100%) can release the exceeding electrical energy to the energy storage element C2 and the resistor R2. In a third period T3 of the battery balancing period, the switches SW3 and SW4 are turned on and the switches SW1, SW2 and SW5 are turned off. Accordingly, the switch unit 110 connects the positive electrode terminal and the negative electrode terminal of the third battery unit B3 to the first terminal and the second terminal of the third energy storage element C3 respectively. In a fourth period T4 of the battery balancing period, the switches SW4 and SW5 are turned on and the switches SW1, SW2 and SW3 are turned off. Accordingly, the switch unit 110 can connect the positive electrode terminal and the negative electrode terminal of the fourth battery unit B4 to the first terminal and the second terminal of the fourth energy storage element C4 respectively, so that the fourth energy storage element C4 can charge the fourth battery unit B4 which is not fully-charged (the capacity thereof does not reach 100%).

Figure 5:
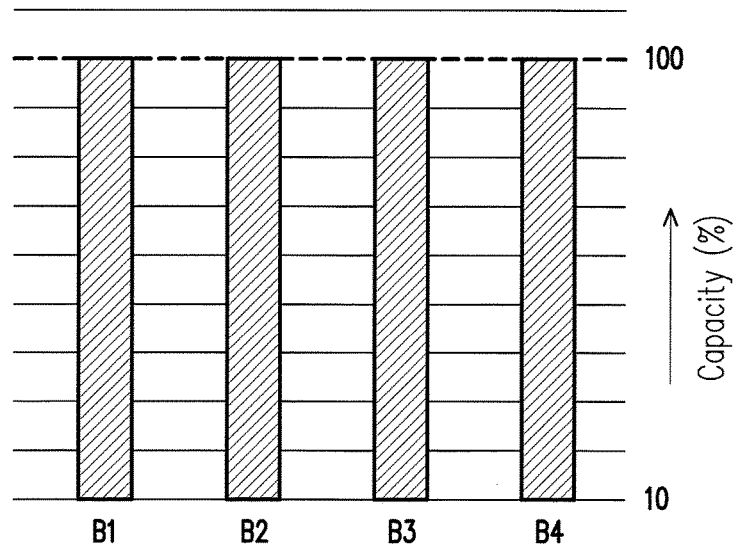
FIG. 5 is a schematic diagram illustrating a battery capacity of the battery pack 200 depicted in FIG. 2 after the battery balancing is performed on the battery pack 200 by the battery balancing apparatus 100 according to an embodiment of the invention.

After the battery balancing period (the periods T1 to T4) ends, the battery balancing apparatus 100 can enter the initializing period T0 again. After the initializing period T0 ends, the battery balancing apparatus 100 can enter the battery balancing period (the periods T1 to T4) again in order to perform the battery balancing for the battery pack 200. By analogy, by repeatedly and cyclically entering the initializing period T0 and the battery balancing period (the periods T1 to T4), the capacity of each of the battery units B1 to B4 will approach the rated voltage. FIG. 5 is a schematic diagram illustrating a battery capacity of the battery pack 200 depicted in FIG. 2 after the battery balancing is performed on the battery pack 200 by the battery balancing apparatus 100 according to an embodiment of the invention. By repeatedly and cyclically performing aforesaid battery balancing operation, the voltages (capacities) of the battery units B1 to B4 may be balanced (as shown in FIG. 5).

Figure 6:
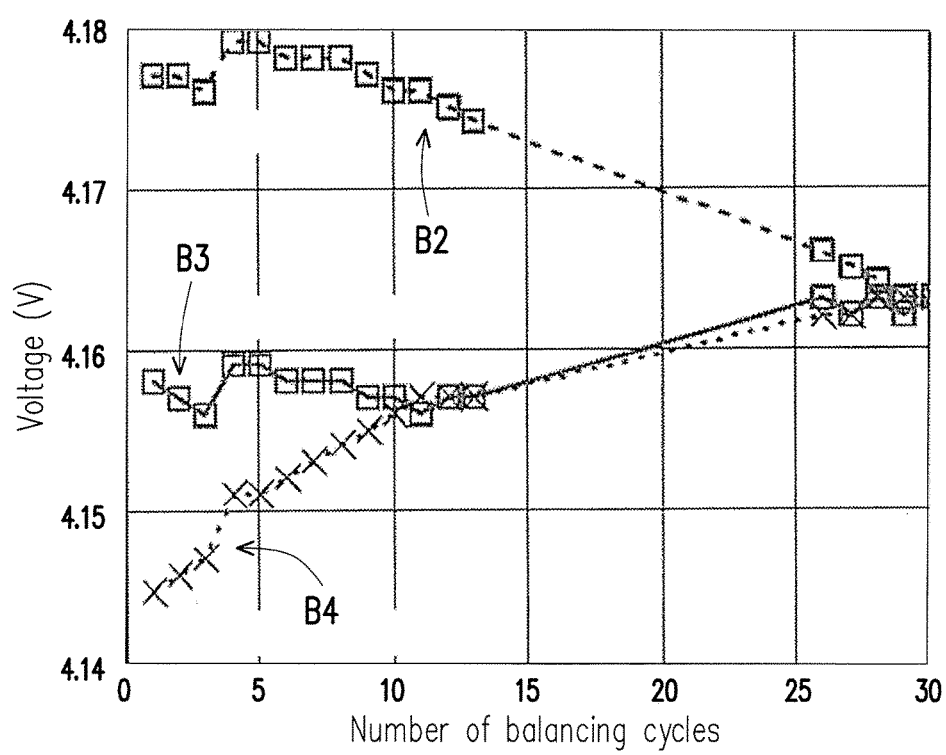
FIG. 6 is a schematic curve diagram illustrating variations in the battery capacities of the battery units B2 to B4 depicted in FIG. 2 and FIG. 3 during a battery balancing cycle according to an embodiment of the invention.

FIG. 6 is a schematic curve diagram illustrating variations in the battery capacities of the battery units B2 to B4 depicted in FIG. 2 and FIG. 3 according to an embodiment of the invention. The battery unit B1 as depicted in FIG. 2 and FIG. 3 may refer to related descriptions in the foregoing embodiments. As shown in FIG. 6, after the battery balancing operation is performed for multiple times (referring to related descriptions in FIG. 4), the voltage (capacity) of each of the battery units B2 to B4 may be balanced to the rated fully-charged voltage. A number of times for performing the battery balancing operation may be determined according to design requirements and/or the specifications (e.g., an electrical capacity) of the battery units B2 to B4. In the example of FIG. 6, after the battery balancing operation is performed for approximately 30 times, the battery units B2 to B4 may be balanced to reach the same voltage.

Figure 7:
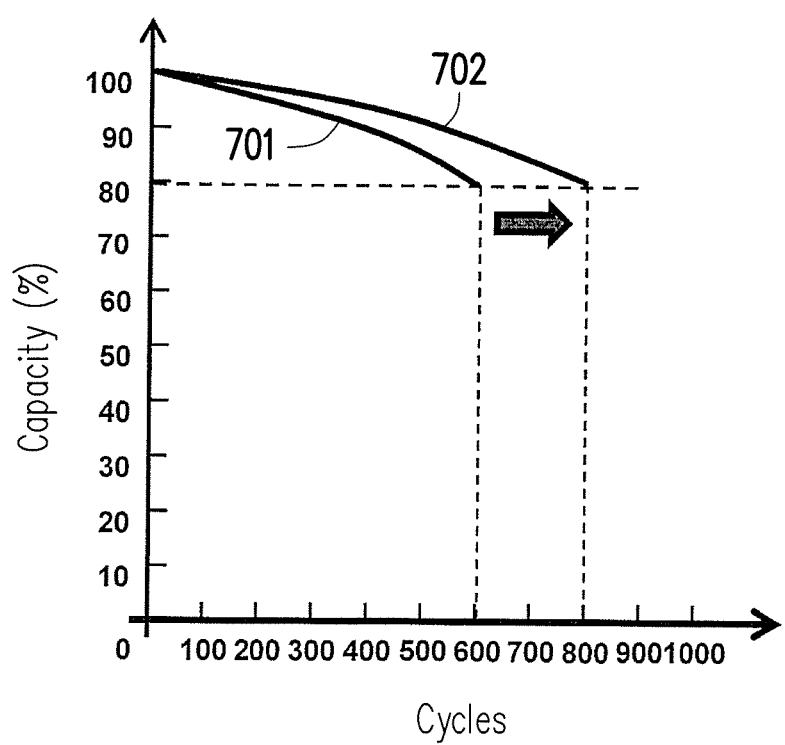
FIG. 7 is a schematic diagram illustrating a relation between an electrical capacity and a usage cycle of a fully-charged battery according to an embodiment of the invention.

FIG. 7 is a schematic diagram illustrating a relation between an electrical capacity and a usage cycle of a fully-charged battery according to an embodiment of the invention. As shown in FIG. 7, a curve 701 represents a lifetime of the battery unit in the case where the battery balancing is not performed. If the battery balancing is not performed during usage of the battery unit, damages on the battery unit may increase as a number of the usage cycles increases, resulting in dropping of the electrical capacity in the fully-charged battery. As shown in FIG. 7, a curve 702 represents a lifetime of the battery unit in the case where the battery balancing is performed. If the battery balancing is performed during usage of the battery unit, damages on the battery unit may be reduced while slowing down a dropping speed of the electrical capacity in the fully-charged battery, so as to extend the lifetime of the battery unit.

Figure 8:
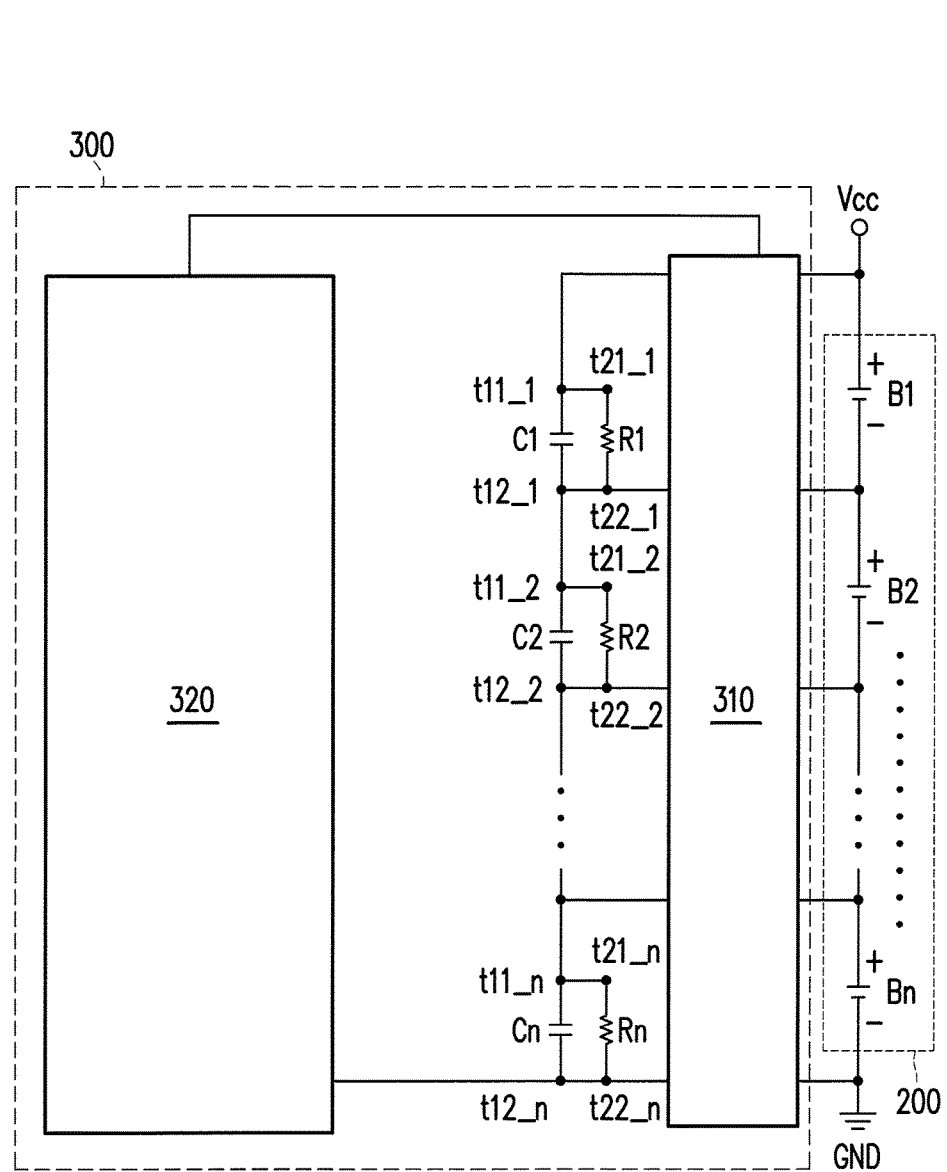
FIG. 8 is a schematic diagram illustrating circuitry of a battery balancing apparatus according to another embodiment of the invention.

FIG. 8 is a schematic diagram illustrating circuitry of a battery balancing apparatus 300 according to another embodiment of the invention. The battery balancing apparatus 300 includes a control unit 320, energy storage elements C1 to Cn, resistors R1 to Rn and a switch unit 310. The battery balancing apparatus 300, the battery units B1 to Bn, the switch unit 310, the energy storage elements C1 to Cn and the resistors R1 to Rn as shown in FIG. 8 may refer to the related descriptions of the battery balancing apparatus 100, the battery units B1 to Bn, the switch unit 110, the energy storage elements C1 to Cn and the resistors R1 to Rn in FIG. 1 to FIG. 7, which are not repeated hereinafter.

In the present embodiment, the control unit 320 is connected to the switch unit 310. The control unit 320 can output a control signal to control the switch unit 310. Under control of the control unit 320, the switch unit 310 can perform the battery balancing on at least one battery unit (e.g., the $i^{th}$ battery unit Bi) of the battery units B1 to Bn together with at least one energy storage element (e.g., the $i^{th}$ energy storage element Ci) of the energy storage elements C1 to Cn. For instance, if the number n of the battery units B1 to Bn is 4, the control unit 320 can control the switch unit 310 according to the description of FIG. 4.

In some other embodiments (but not limited thereto), the control unit 320 of FIG. 8 can also detect an individual battery capacity (or the battery voltage) of each of the battery units B1 to Bn, and dynamically determine whether to trigger the switch unit 310 for performing the battery balancing according a detection result. For instance, when the control unit 320 detects that a voltage of the at least one battery unit (e.g., the $i^{th}$ battery unit Bi) among the battery units B1 to Bn is not equal to a voltage of the corresponding energy storage element (e.g., the $i^{th}$ energy storage element Ci), the control unit 320 can dynamically (selectively) control the switch unit 310 to connect the positive electrode terminal and the negative electrode terminal of the $i^{th}$ battery unit Bi to the first terminal and the second terminal of the $i^{th}$ energy storage element Ci respectively, so as to perform the battery balancing operation.

Figure 9:
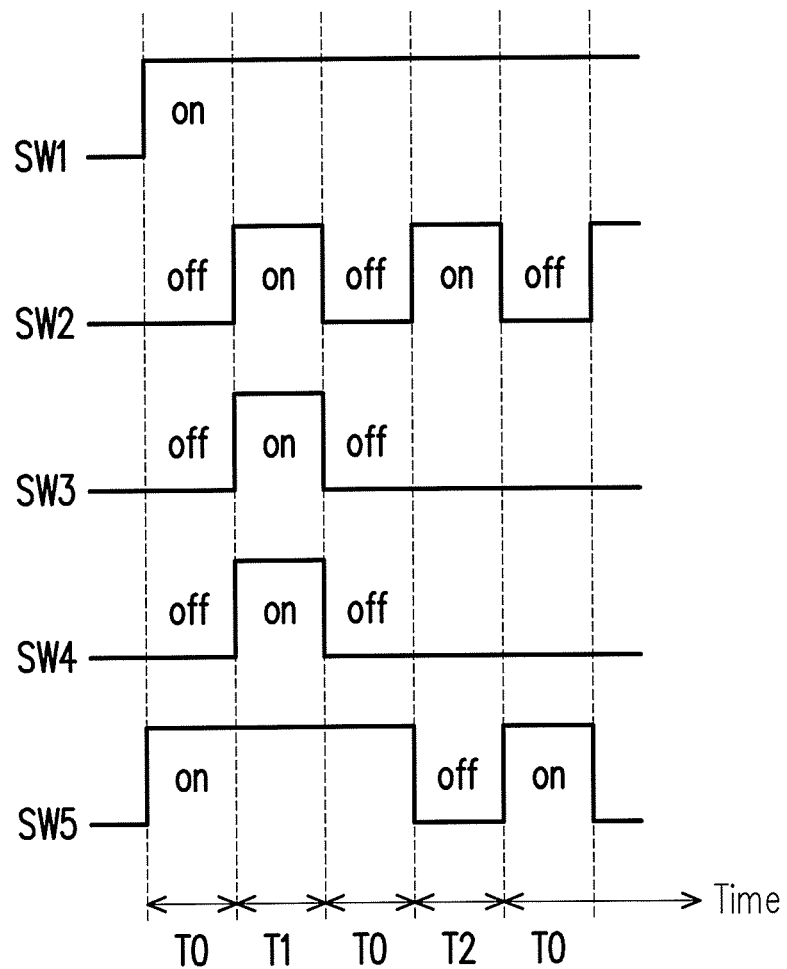
FIG. 9 is a schematic diagram illustrating a switching time sequence when the switch unit depicted in FIG. 2 is performing the battery balancing according to another embodiment of the invention.

For illustrative convenience, it is assumed herein that a number n of the battery units B1 to Bn is 4, and the detailed embodiment of the battery balancing apparatus 300 depicted in FIG. 8 is accordingly illustrated in FIG. 2. FIG. 9 is a schematic diagram illustrating a switching time sequence when the switch unit 310 depicted in FIG. 2 is performing the battery balancing according to another embodiment of the invention. The battery balancing apparatus 300 performs the initialization for the energy storage elements C1 to C4 in an initializing period T0. In the initializing period T0, the switches SW1 and SW5 are turned on and the switches SW2, SW3 and SW4 are turned off. Accordingly, the switch unit 310 can connect the system voltage Vcc to the first terminal of the first energy storage element C1, and connect the ground voltage GND to the second terminal of the fourth energy storage element C4. The resistors R1 to R4 connected to each other in series can divide the system voltage Vcc according to a resistance ratio, so as to determine/provide a plurality of voltage-divided voltages to the energy storage elements C1 to C4. Each of the voltage-divided voltages charges respective one of the energy storage elements C1 to C4, so as to determine an initial voltage of each of the energy storage elements C1 to C4. In the initializing period T0, the control unit 320 may also detect an individual battery voltage of each of the battery units B1 to B4. Herein, it is assumed that the individual battery voltages (the capacities) of the battery units B1 to B4 are as shown in FIG. 3.

After the initializing period T0 ends, the battery balancing apparatus 300 can perform the battery balancing for the battery pack 200 according a detection result. In a first period T1 of a battery balancing period, the voltages of the battery units B1, B2 and B4 are not equal to the voltages of the corresponding energy storage elements C1, C2 and C4 (that is, the voltages of the battery units B1, B2 and B4 do not reach the rated fully-charged voltage, as shown in FIG. 3). Accordingly, the control unit 320 can dynamically (selectively) turn on the switches SW1, SW2, SW3, SW4 and SW5, so as to perform the battery balancing operation for the battery units B1, B2 and B4. After the battery balancing period (the period T1) ends, the battery balancing apparatus 300 can enter the initializing period T0 again. In the initializing period T0 of the second time, the control unit 320 may detect the individual battery voltage of each of the battery units B1 to B4 again. Herein, it is assumed that the battery voltages of the battery units B2 to B4 already reach the rated fully-charged voltage but the battery unit B1 does not reach the rated fully-charged voltage yet.

After the initializing period T0 of the second time ends, the battery balancing apparatus 300 can perform the battery balancing for the battery pack 200 again according a new detection result. In a second period T1 of the battery balancing period, the voltage of the battery unit B1 is not equal to the voltage of the corresponding energy storage element C1 (that is, the voltage of the battery unit B1 does not reach the rated fully-charged voltage yet). Accordingly, the control unit 320 can dynamically (selectively) turn on the switches SW1 and SW2 and turn off the switches SW3, SW4 and SW5, so as to perform the battery balancing operation for the battery unit B1. After the battery balancing period (the period T2) ends, the battery balancing apparatus 300 can enter the initializing period T0 again. By analogy, the initializing period T0 and the battery balancing periods can be repeatedly and cyclically entered until the capacity of each of the battery units B1 to B4 approaches the rated voltage (the voltages of the battery units B1 to B4 reach the rated fully-charged voltage).

Figure 10:
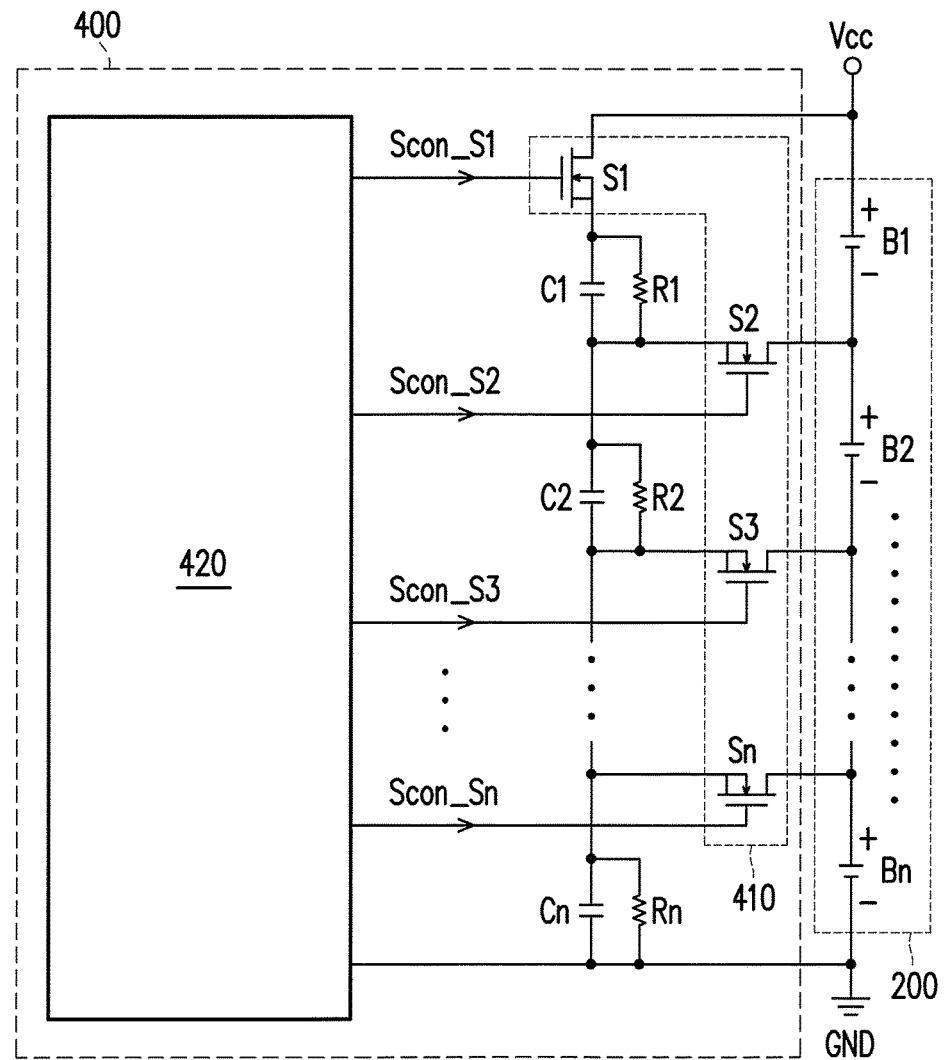
FIG. 10 is a schematic diagram illustrating circuitry of a battery balancing apparatus according to another embodiment of the invention.

FIG. 10 is a schematic diagram illustrating circuitry of a battery balancing apparatus 400 according to another embodiment of the invention. The battery balancing apparatus 400 includes a control unit 420, energy storage elements C1 to Cn, resistors R1 to Rn and a switch unit 410. The battery balancing apparatus 400, the battery units B1 to Bn, the switch unit 410, the energy storage elements C1 to Cn and the n resistors R1 to Rn as shown in FIG. 10 may refer to the related descriptions of the battery balancing apparatus 100, the battery units B1 to Bn, the switch unit 110, the energy storage elements C1 to Cn and the resistors R1 to Rn in FIG. 1 to FIG. 7, which are not repeated hereinafter. The switch unit 410 and the control unit 420 as shown in FIG. 10 may refer to related descriptions of the switch unit 310 and the control unit 320 in FIG. 8, which are not repeated hereinafter.

In the embodiment shown in FIG. 10, the switch unit 410 includes n switches S1, S2, S3, . . . , Sn. Herein, for example, the switches S1 to Sn are N-type metal oxide semiconductor (NMOS) field effect transistors, where a first terminal of the switch refers to a source of the NMOS transistor, a second terminal of the switch refers to a drain of the NMOS transistor, and a control terminal of the switch refers to a gate of the NMOS transistor. However, the switches of the invention are not limited only to be this type of transistors. In other embodiments, the switches S1 to Sn of FIG. 10 may be the P-type metal oxide semiconductor (PMOS) field effect transistors or other types of switch elements/circuits. The first terminals and the second terminals of the switches S1 to Sn are connected to battery units B1 to Bn and the energy storage elements C1 to Cn respectively, and the control terminals are all connected to the control unit 420. For instance, the first terminal of an $i^{th}$ switch Si among the switches S1 to Sn is connected to the positive electrode terminal of the $i^{th}$ battery unit Bi. The second terminal of the $i^{th}$ switch Si is connected to the first terminal of the $i^{th}$ energy storage element Ci. The negative electrode terminal of the $n^{th}$ battery unit Bn is connected to the second terminal of the $n^{th}$ energy storage element Cn.

In the embodiment shown in FIG. 10, the control unit 420 may output control signals Scon_S1, Scon_S2, Scon_S3, Scon_Sn. The control signals Scon_S1 to Scon_Sn are output to the control terminals of switches S1 to Sn of the switch unit 410 respectively. Therefore, the control unit 420 may control the battery balancing apparatus 400, so as to perform the battery balancing operation for the battery unit B1 to Bn.

In the initializing period, the control unit 420 can turn on the switch Si and turn off the remaining switches S2 to Sn, so that the system voltage Vcc can charge the energy storage elements C1 to Cn. Subsequently, in a first period of a battery balancing period, the control unit 420 can turn on the switches S1 and S2 and turn off the remaining switches S3 to Sn, so as to perform the battery balancing for the battery unit Bl. In a second period of the battery balancing period, the control unit 420 can turn on the switches S2 and S3 and turn off the remaining switches S1 and S4 to Sn, so as to perform the battery balancing for the battery unit B2. By analogy, in an $n^{th}$ period of the battery balancing period, the control unit 420 can turn on the switch Sn and turn off the remaining switches, so as to perform the battery balancing for the battery unit Bn. The initializing period and the battery balancing periods can be repeatedly and cyclically entered until the capacity of each of the battery units B1 to Bn approaches the rated voltage (the voltages of the battery units B1 to Bn reach the rated fully-charged voltage).

Nonetheless, operations in the battery balancing period are not limited to the above. For instance (in another embodiment), in the first period of the battery balancing period, the control unit 420 can turn on the switches S1, S2 and S3 (or more switches) and turn off the remaining switches, so as to perform the battery balancing for the battery units B1 and B2 (or more battery units). In the second period of the battery balancing period, the control unit 420 can turn on the switches S2, S3 and S4 (or more switches) and turn off the remaining switches, so as to perform the battery balancing for the battery units B2 and B3 (or more battery units). By analogy, in an $(n-1)^{th}$ period of the battery balancing period, the control unit 420 can turn on the switches Sn−1 and Sn (or more switches) and turn off the remaining switches, so as to perform the battery balancing for the battery units Bn−1 and Bn (or more battery units). The initializing period and the battery balancing periods can be repeatedly and cyclically entered until the capacity of each of the battery units B1 to Bn approaches the rated voltage (the voltages of the battery units B1 to Bn reach the rated fully-charged voltage).

Figure 11:
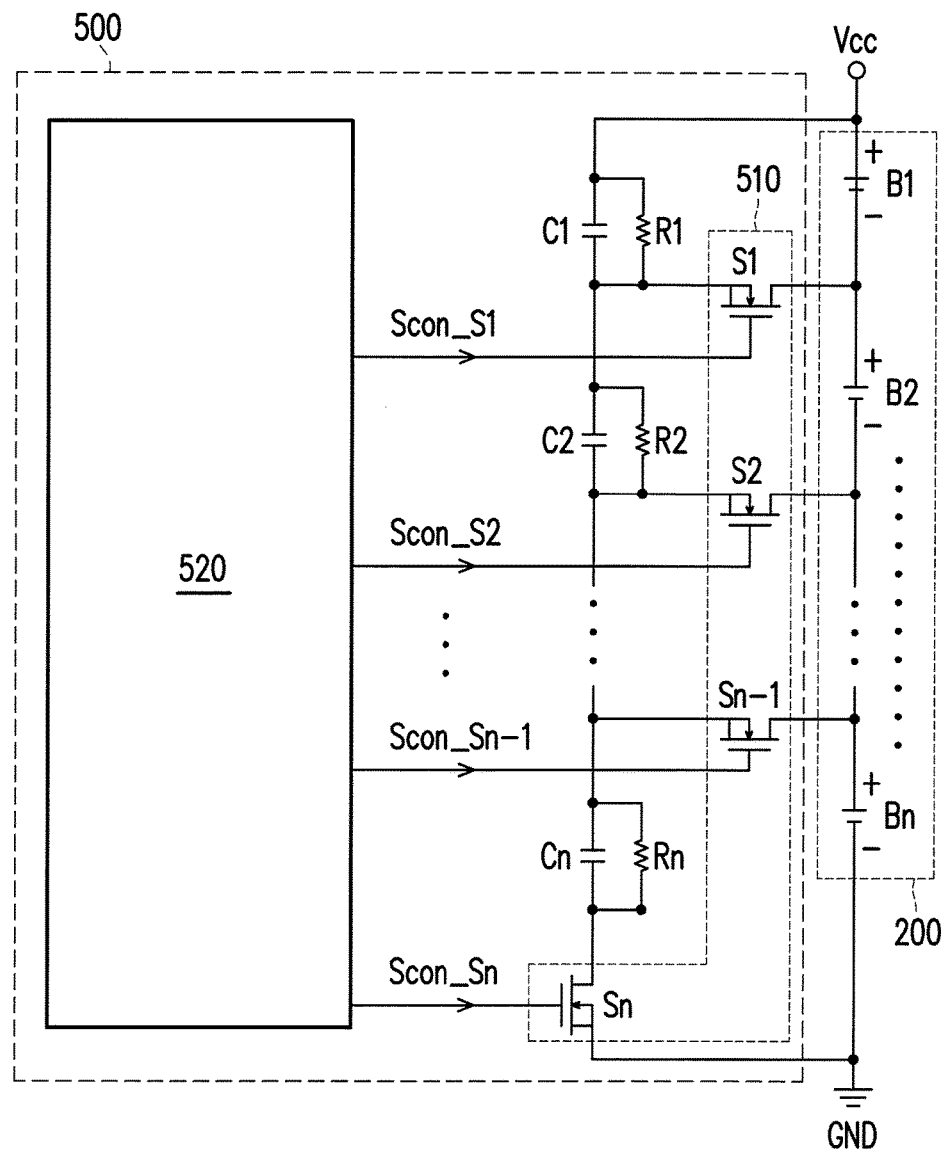
FIG. 11 is a schematic diagram illustrating circuitry of a battery balancing apparatus according to another embodiment of the invention.

FIG. 11 is a schematic diagram illustrating circuitry of a battery balancing apparatus 500 according to another embodiment of the invention. The battery balancing apparatus 500 includes a control unit 520, energy storage elements C1 to Cn, resistors R1 to Rn and a switch unit 510. The battery balancing apparatus 500, the battery units B1 to Bn, the switch unit 510, the energy storage elements C1 to Cn and the n resistors R1 to Rn as shown in FIG. 11 may refer to the related descriptions of the battery balancing apparatus 100, the battery units B1 to Bn, the switch unit 110, the energy storage elements C1 to Cn and the resistors R1 to Rn in FIG. 1 to FIG. 7, which are not repeated hereinafter. The control unit 520 in FIG. 11 may refer to related descriptions of the control unit 320 in FIG. 8 or the control unit 420 in FIG. 10, which are not repeated hereinafter.

In the embodiment shown in FIG. 11, the switch unit 510 includes n switches S1, S2, . . . , Sn−1, Sn. The switches S1 to Sn in FIG. 11 may refer to the related descriptions of the switches S1 to Sn of FIG. 10. The first terminals and the second terminals of the switches S1 to Sn are connected to the battery units B1 to Bn and the energy storage elements C1 to Cn respectively. The control terminals of the switches S1 to Sn are all connected to the control unit 520. For instance, the first terminal of an $i^{th}$ switch Si among the switches S1 to Sn is connected to the negative electrode terminal of the $i^{th}$ battery unit Bi. The second terminal of the $i^{th}$ switch Si is connected to the second terminal of the $i^{th}$ energy storage element Ci. The positive electrode terminal of the first battery unit B1 is connected to the first terminal of the first energy storage element C1.

In the embodiment shown in FIG. 11, the control unit 520 may output control signals Scon_S1, Scon_S2, . . . , Scon_Sn−1, Scon_Sn. The control signals Scon_S1 to Scon_ Sn are output to the control terminals of the switches S1 to Sn of the switch unit 510 respectively. Therefore, the control unit 520 may control the battery balancing apparatus 500, so as to perform the battery balancing operation for the battery unit B1 to Bn.

In the initializing period, the control unit 520 can turn on the switch Sn and turn off the remaining switches S1 to Sn−1, so that the system voltage Vcc can charge the energy storage elements C1 to Cn. Subsequently, in a first period of a battery balancing period, the control unit 520 can turn on the switches S1 and turn off the remaining switches S2 to Sn, so as to perform the battery balancing for the battery unit B1. In a second period of the battery balancing period, the control unit 520 can turn on the switches S1 and S2 and turn off the remaining switches S3 to Sn, so as to perform the battery balancing for the battery unit B2. By analogy, in an $n^{th}$ period of the battery balancing period, the control unit 520 can turn on the switches Sn−1 and Sn and turn off the remaining switches, so as to perform the battery balancing for the battery unit Bn. The initializing period and the battery balancing periods can be repeatedly and cyclically entered until the capacity of each of the battery units B1 to Bn approaches the rated voltage (the voltages of the battery units B1 to Bn reach the rated fully-charged voltage).

Nonetheless, operations in the battery balancing period are not limited to the above. For instance (in another embodiment), in the first period of the battery balancing period, the control unit 520 can turn on the switches S1 and S2 (or more switches) and turn off the remaining switches, so as to perform the battery balancing for the battery units B1 and B2 (or more battery units). In the second period of the battery balancing period, the control unit 520 can turn on the switches S1, S2 and S3 (or more switches) and turn off the remaining switches, so as to perform the battery balancing for the battery units B2 and B3 (or more battery units). In the third period of the battery balancing period, the control unit 520 can turn on the switches S2, S3 and S4 (or more switches) and turn off the remaining switches, so as to perform the battery balancing for the battery units B3 and B4 (or more battery units). By analogy, in an $(n-1)^{th}$ period of the battery balancing period, the control unit 520 can turn on the switches Sn−2, Sn−1 and Sn (or more switches) and turn off the remaining switches, so as to perform the battery balancing for the battery units Bn−1 and Bn (or more battery units). The initializing period and the battery balancing periods can be repeatedly and cyclically entered until the capacity of each of the battery units B1 to Bn approaches the rated voltage (the voltages of the battery units B1 to Bn reach the rated fully-charged voltage).

Figure 12:
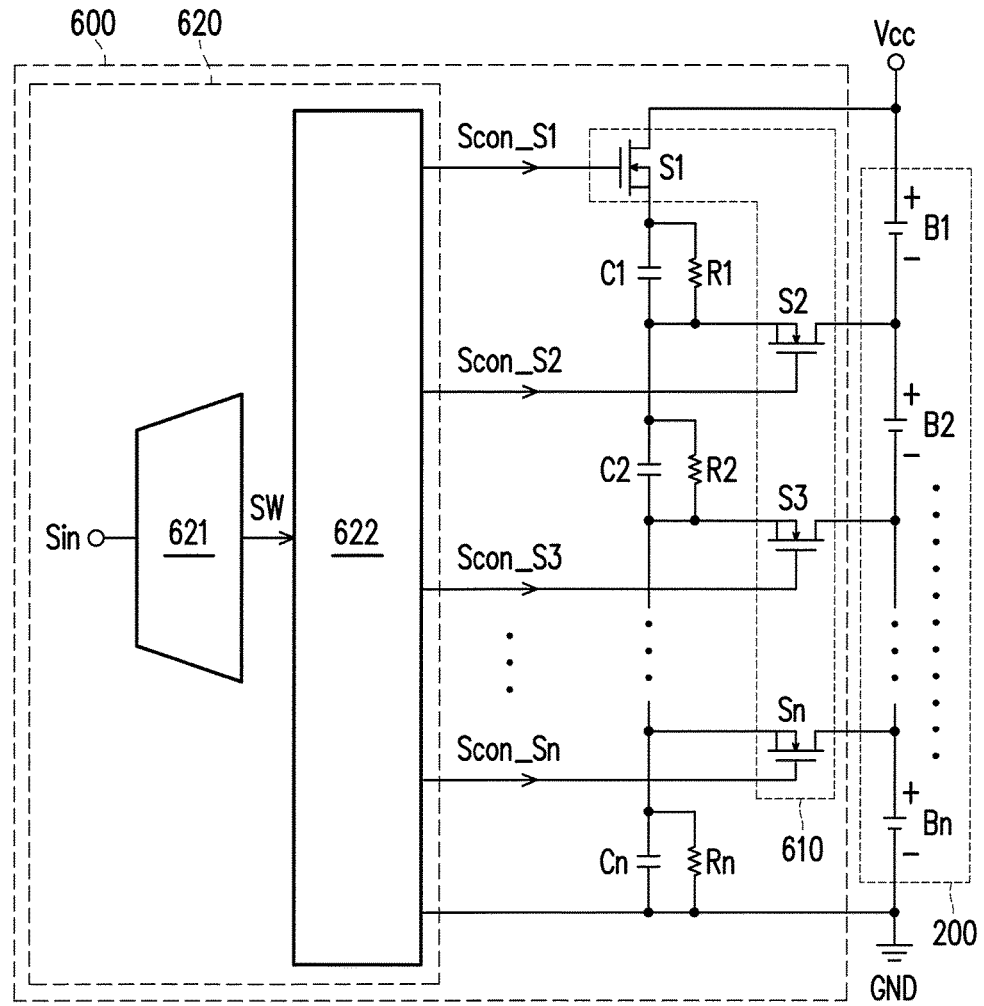
FIG. 12 is a schematic diagram illustrating circuitry of a battery balancing apparatus according to another embodiment of the invention.

FIG. 12 is a schematic diagram illustrating circuitry of a battery balancing apparatus 600 according to another embodiment of the invention. The battery balancing apparatus 600 includes a control unit 620, energy storage elements C1 to Cn, resistors R1 to Rn and a switch unit 610. The battery balancing apparatus 600, the battery units B1 to Bn, the energy storage elements C1 to Cn, the resistors R1 to Rn, the control unit 620, a switch unit 610 and switches S1 to Sn as shown in FIG. 12 may refer to the related descriptions of the battery balancing apparatus 600, the battery units B1 to Bn, the energy storage elements C1 to Cn, the resistors R1 to Rn, the control unit 420, the switch unit 410 and the switches S1 to Sn in FIG. 10, which are not repeated hereinafter.

In the present embodiment, the control unit 620 in FIG. 12 includes a switching matrix unit 621 and a driving circuit 622. The switching matrix unit 621 can receive an external input signal Sin and convert the external input signal Sin into a switching signal Sw to be outputted. The driving circuit 622 can receive the switching signal Sw, and convert the switching signal Sw into control signals Scon_S1, Scon_S2, Scon_S3, . . . , Scon_Sn. The control signals Scon_S1 to Scon_Sn are outputted to the control terminal of each of the switches S1 to Sn of the switch unit 610. Accordingly, a front-end circuit or a system (e.g., an operating system, a power management program or an application) can control the battery balancing apparatus 600 through the external input signal Sin, so as to perform the battery balancing for the battery units B1 to Bn.

It should be noted that, under different application scenarios, related functions of aforesaid control circuit (e.g., 320, 420, 520), the switching matrix unit 621 and/or the driving circuit 622 can be implemented as software, firmware or hardware by utilizing common programming languages (e.g., C or C++), hardware description languages (e.g., Verilog HDL or VHDL) or other suitable programming languages. The software (or the firmware) capable of executing the related functions can be arranged into any known computer-accessible media such as magnetic tapes, semiconductor memories, magnetic disks or compact disks (e.g., CD-ROM or DVD-ROM); or the software (or the firmware) may be transmitted via the Internet, a wired communication, a wireless communication or other communication mediums. Said software (or the firmware) can be stored in the computer-accessible media, so that a computer processor can access/execute programming codes of the software (or the firmware). In addition, the device and the method of the invention can also be implemented by a combination of software and hardware.

Figure 13:
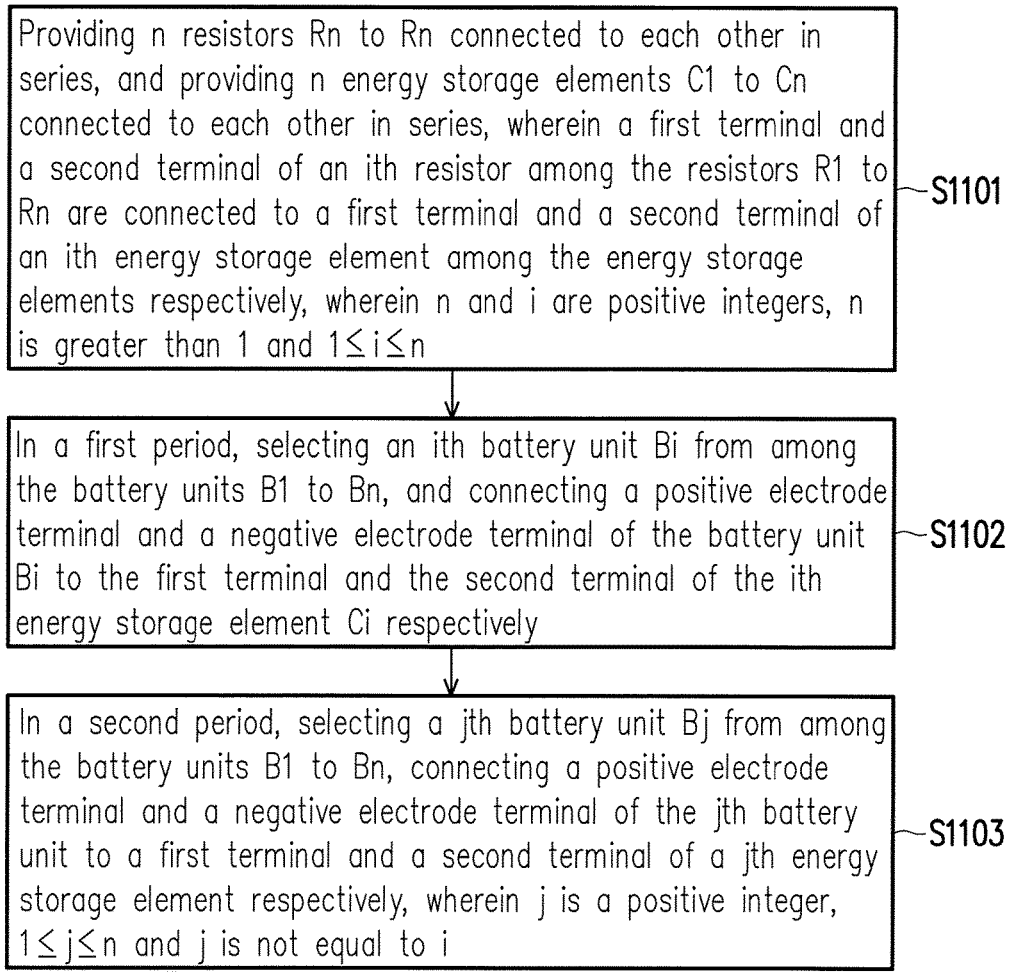
FIG. 13 is a schematic flowchart illustrating a battery balancing method according to an embodiment of the invention.

FIG. 13 is a schematic flowchart illustrating a battery balancing method according to an embodiment of the invention. Referring to FIG. 1 and FIG. 13 together. First of all, in step S1101, for a battery pack 200 including a plurality of battery units B1 to Bn, a battery balancing apparatus 100 is provided, n resistors Rn to Rn connected to each other in series are provided, and n energy storage elements C1 to Cn connected to each other in series are provided. A first terminal t21_i and a second terminal t22_i of an $i^{th}$ resistor among the resistors R1 to Rn are connected to a first terminal t11_i and a second terminal t12_i of an $i^{th}$ energy storage element among the energy storage elements respectively, wherein n and i are positive integers, n is greater than 1 and $1 \leq i \leq n$. Subsequently, in step S1102, in a first period, an $i^{th}$ battery unit Bi is selected from among the battery units B1 to Bn, and a positive electrode terminal and a negative electrode terminal of the $i^{th}$ battery unit are connected to the first terminal t11_i and the second terminal t12_i of the $i^{th}$ energy storage element Ci respectively, so as to perform a battery balancing. In step S1103, in a second period, a $j^{th}$ battery unit Bj is selected from among the battery units B1 to Bn, a positive electrode terminal and a negative electrode terminal of the $j^{th}$ battery unit are connected to a first terminal t11_j and a second terminal t12_j of a $j^{th}$ energy storage element respectively, wherein j is a positive integer, $1 \leq j \leq n$ and j is not equal to i. Furthermore, in step S1103, in the second period, at least one of the positive electrode terminal and the negative electrode terminal of the $i^{th}$ battery unit are disconnected from the first terminal t11_i and the second terminal t12_i of the $i^{th}$ energy storage element.

Figure 14:
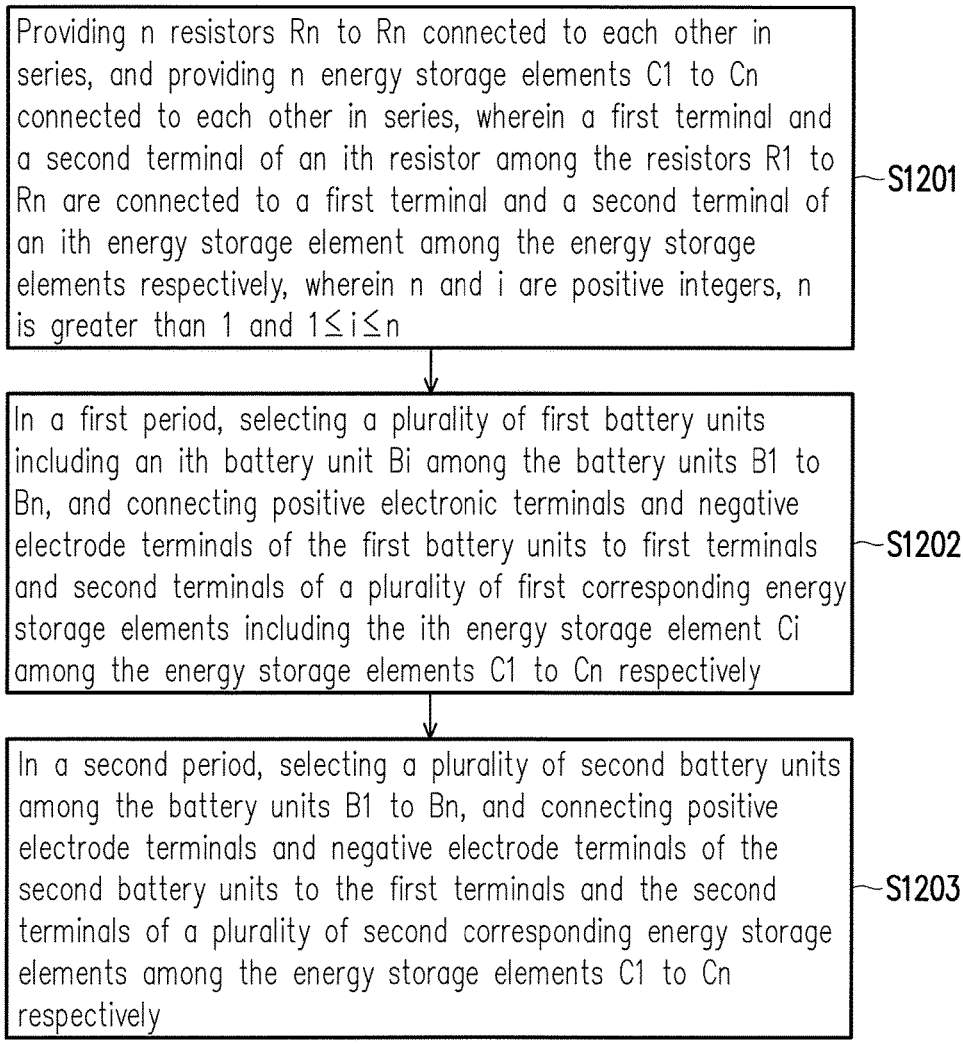
FIG. 14 is a schematic flowchart illustrating another battery balancing method according to an embodiment of the invention.

FIG. 14 is a schematic flowchart illustrating a battery balancing method according to another embodiment of the invention. Referring to FIG. 1 and FIG. 14 together. First of all, in step S1201, for a battery pack 200 including a plurality of battery units B1 to Bn, a battery balancing apparatus 100 is provided, n resistors Rn to Rn connected to each other in series are provided, and n energy storage elements C1 to Cn connected to each other in series are provided. A first terminal t21_i and a second terminal t22_i of an $i^{th}$ resistor among the resistors R1 to Rn are connected to a first terminal t11_i and a second terminal t12 i of an $i^{th}$ energy storage element among the energy storage elements respectively, wherein n and i are positive integers, n is greater than 1 and $1 \leq i \leq n$. Subsequently, in step S1202, in a first period, a plurality of first battery units including an $i^{th}$ battery unit Bi is selected from among the battery units B1 to Bn, and positive electronic terminals and negative electrode terminals of the first battery units are connected to first terminals and second terminals of a plurality of first corresponding energy storage elements including the $i^{th}$ energy storage element Ci among the energy storage elements C1 to Cn respectively, so as to perform a battery balancing. In step S1203, in a second period, a plurality of second battery units is selected from among the battery units B1 to Bn, and positive electrode terminals and negative electrode terminals of the second battery units are connected to the first terminals and the second terminals of a plurality of second corresponding energy storage elements among the energy storage elements C1 to Cn respectively, so as to perform a battery balancing.

It should be noted that, in the embodiments of FIG. 13 and FIG. 14, before the battery balancing apparatus 100 performs the battery balancing for the batter pack 200, the battery balancing apparatus 100 performs an initialization on voltages of the energy storage elements C1 to Cn in an initializing period. In the initializing period, the control unit 110 can use the system voltage Vcc to charge the energy storage elements C1 to Cn.

In summary, the battery balancing apparatus and the battery balancing method as disclosed according to the embodiments of the present disclosure can be used to balance the battery capacity of the battery pack. The battery balancing apparatus includes the n energy storage elements connected to each other in series and the n resistors connected to each other in series. The switch unit can connect different battery units to the corresponding energy storage elements in different time periods during the battery balancing period.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery balancing apparatus, configured to perform a battery balancing for a battery pack, and comprising:
   n energy storage elements, connected to each other in series;
   n resistors, connected to each other in series, wherein a first terminal and a second terminal of an $i^{th}$ resistor among the resistors are connected to a first terminal and a second terminal of an $i^{th}$ energy storage element among the energy storage elements respectively, wherein n and i are positive integers, n is greater than 1 and $1 \leq i \leq n$; and
   a switch unit, configured to connect the n energy storage elements with n battery units connected to each other in series in the battery pack, wherein in a first period, the switch unit selects an $i^{th}$ battery unit from among the battery units, and connects a positive electrode terminal and a negative electrode terminal of the $i^{th}$ battery unit to the first terminal and the second terminal of the $i^{th}$ energy storage element respectively, so as to perform the battery balancing.

2. The battery balancing apparatus of claim 1, wherein each of the energy storage elements is a capacitor.

3. The battery balancing apparatus of claim 1, wherein the switch unit comprises:
   n switches, wherein first terminals and second terminals of the switches are connected to the battery units and the energy storage elements respectively.

4. The battery balancing apparatus of claim 3, wherein the first terminal of an $i^{th}$ switch in the switch unit is connected to the positive electrode terminal of the $i^{th}$ battery unit, the second terminal of the $i^{th}$ switch is connected to the first terminal of the $i^{th}$ energy storage element, and a negative electrode terminal of an $n^{th}$ battery unit among the battery units is connected to a second terminal of an $n^{th}$ energy storage element among the energy storage elements.

5. The battery balancing apparatus of claim 3, wherein the first terminal of an $i^{th}$ switch in the switch unit is connected to the negative electrode terminal of the $i^{th}$ battery unit, the second terminal of the $i^{th}$ switch is connected to the second terminal of the $i^{th}$ energy storage element, and a positive electrode terminal of a first battery unit among the battery units is connected to a first terminal of a first energy storage element among the energy storage elements.

6. The battery balancing apparatus of claim 1, further comprising:
a control unit, connected to the switch unit, and configured to output a control signal to control the switch unit such that at least one $i^{th}$ battery unit among the battery units performs the battery balancing together with at least one $i^{th}$ energy storage element among the energy storage elements.

7. The battery balancing apparatus of claim 6, wherein the control unit comprises:
a switching matrix unit, configured to receive an external input signal and convert the external input signal into a switching signal to be outputted; and
a driving circuit, configured to receive the switching signal and convert the switching signal into a control signal to be outputted to the switch unit.

8. The battery balancing apparatus of claim 1, further comprising:
a control unit, connected to the switch unit, and configured to detect battery voltages of the battery units, wherein when the battery voltage of the $i^{th}$ battery unit among the battery units is not equal to a voltage of the $i^{th}$ energy storage element, the control unit controls the switch unit to connect the positive electrode terminal and the negative electrode terminal of the $i^{th}$ battery unit to the first terminal and the second terminal of the $i^{th}$ energy storage element respectively.

9. The battery balancing apparatus of claim 1, wherein in a second period, the switch unit selects a $j^{th}$ battery unit from among the battery units, connects a positive electrode terminal and a negative electrode terminal of the $j^{th}$ battery unit to a first terminal and a second terminal of a $j^{th}$ energy storage element respectively, and disconnects at least one of the positive electrode terminal and the negative electrode terminal of the $i^{th}$ battery unit from the first terminal and the second terminal of the $i^{th}$ energy storage element, wherein j is a positive integer, $1 \le j \le n$ and j is not equal to i.

10. The battery balancing apparatus of claim 1, wherein in the first period, the switch unit selects a plurality of first battery units including the $i^{th}$ battery units from among the battery units, and connects positive electrode terminals and negative electrode terminals of the first battery units to first terminals and second terminals of a plurality of first corresponding energy storage elements including the $i^{th}$ energy storage element among the energy storage elements respectively; and in a second period, the switch unit selects a plurality of second battery units from among the battery units, and connects positive electrode terminals and negative electrode terminals of the second battery units to first terminals and second terminals of a plurality of second corresponding energy storage elements among the energy storage elements respectively.

11. A battery balancing method, configured to perform a battery balancing for a battery pack, and comprising:
providing n resistors connected to each other in series;
providing n energy storage elements connected to each other in series, wherein a first terminal and a second terminal of an $i^{th}$ resistor among the resistors are connected to a first terminal and a second terminal of an $i^{th}$ energy storage element among the energy storage elements respectively, wherein n and i are positive integers, n is greater than 1 and $1 \le i \le n$; and
in a first period, selecting an $i^{th}$ battery unit from among the battery units, and connecting a positive electrode terminal and a negative electrode terminal of the $i^{th}$ battery unit to the first terminal and the second terminal of the $i^{th}$ energy storage element respectively.

12. The battery balancing method of claim 11, wherein each of the energy storage elements is a capacitor.

13. The battery balancing method of claim 11, further comprising:
detecting battery voltages of the battery units, wherein when the battery voltage of the $i^{th}$ battery unit among the battery units is not equal to a voltage of the $i^{th}$ energy storage element, connecting the positive electrode terminal and the negative electrode terminal of the $i^{th}$ battery unit to the first terminal and the second terminal of the $i^{th}$ energy storage element respectively.

14. The battery balancing method of claim 11, further comprising:
in a second period, selecting a $j^{th}$ battery unit from among the battery units, and connecting a positive electrode terminal and a negative electrode terminal of the $j^{th}$ battery unit to a first terminal and a second terminal of a $j^{th}$ energy storage element among the energy storage elements respectively, wherein j is a positive integer, $1 \le j \le n$ and j is not equal to i; and
in the second period, disconnecting at least one of the positive electrode terminal and the negative electrode terminal of the $i^{th}$ battery unit from the first terminal and the second terminal of the $i^{th}$ energy storage element.

15. The battery balancing method of claim 11, further comprising:
in the first period, selecting a plurality of first battery units including the $i^{th}$ battery units from among the battery units, and connecting positive electrode terminals and negative electrode terminals of the first battery units to first terminals and second terminals of a plurality of first corresponding energy storage elements including the $i^{th}$ energy storage element among the energy storage elements respectively; and
in a second period, selecting a plurality of second battery units from among the battery units, and connecting positive electrode terminals and negative electrode terminals of the second battery units to first terminals and second terminals of a plurality of second corresponding energy storage elements among the energy storage elements respectively.

* * * * *